United States Patent [19]

Wang

[11] Patent Number: 5,771,038
[45] Date of Patent: Jun. 23, 1998

[54] CONTROL DEVICE FOR DISPLAY STATE CHANGE ON MONITOR

[75] Inventor: David Wang, Hsi Chih Town, Taiwan

[73] Assignee: Primax Electronics Ltd., Taipei, Taiwan

[21] Appl. No.: 512,995

[22] Filed: Aug. 9, 1995

[51] Int. Cl.[6] .................................................... G09G 5/08
[52] U.S. Cl. ........................................... 345/163; 345/161
[58] Field of Search .................................... 345/157, 158, 345/161, 163, 164, 165, 167, 173, 184

[56] References Cited

U.S. PATENT DOCUMENTS

| | | |
|---|---|---|
| 4,217,569 | 8/1980 | Nejedly et al. . |
| 4,550,316 | 10/1985 | Whetstone et al. ...................... 345/163 |
| 4,916,440 | 4/1990 | Faeser et al. ............................ 345/161 |
| 4,977,397 | 12/1990 | Kuo et al. ................................ 345/163 |
| 5,095,303 | 3/1992 | Clark et al. ............................. 345/164 |
| 5,298,919 | 3/1994 | Chang ..................................... 345/163 |
| 5,313,229 | 5/1994 | Gilligan et al. ......................... 345/163 |
| 5,313,230 | 5/1994 | Venolia et al. .......................... 345/163 |
| 5,473,344 | 12/1995 | Bacon ..................................... 345/163 |
| 5,530,455 | 6/1996 | Gillick et al. ........................... 345/163 |
| 5,561,445 | 10/1996 | Miwa et al. ............................. 345/163 |

*Primary Examiner*—Regina Liang
*Attorney, Agent, or Firm*—Laff, Whitesel, Conte & Saret, Ltd.

[57] ABSTRACT

The present invention is related to a control device for a display state change on a monitor which includes a housing, a first input device mounted in the housing for determining a movement of a cursor on the monitor in an X- and a Y-directions, a second input device for determining two kinds of display state changes which include a movement of the cursor in a Z-direction and a display state change selected from a group consisting of a rotation operation and a picture change on the monitor, and a control circuit mounted in the housing for executing the display state changes. Various preferred operation modes for controlling the display state change on a monitor are also disclosed in the present invention for purpose of providing a easily manipulated control device with more functions than the conventional mouse and track ball.

17 Claims, 16 Drawing Sheets

CONTROL DEVICE FOR DISPLAY STATE CHANGE ON MONITOR

FIELD OF THE INVENTION

The present invention is related to a control device, and more particularly to a control device for display state change on a monitor.

BACKGROUND OF THE INVENTION

The conventional control devices for display state change on a monitor are generally used for controlling the movement of a cursor on the monitor, and the typical control device, such as mouse and track ball, only provides the function of controlling the movement of the cursor on the monitor in the X- and the Y-directions. Nowadays, with the swift development of multi-media computers, the requirements of special functions for display state change keep on increasing. For example, in a multi-media computer system, a cursor may have to be moved on a stereoscopic picture so that the movement of the cursor in the Z-direction should be controlled. Alternatively, the magnification/reduction operation, the upward/downward scroll, the brightness change or the color change of the picture had better be able to be controlled through a handy control device. Furthermore, it is particularly preferred to handily control the rotation of the entire picture on the X-axis, Y-axis or Z-axis or the rotation of a portion of the picture on an axial line thereof for purpose of, for example, demonstration. The rotation of a certain image in the picture is especially useful in the CAD (computer aided design) field. It is obvious that the conventional control devices only for controlling the movement of a cursor on a monitor in the X- and the Y-directions cannot comply with the requirements of the control for special display state change.

SUMMARY OF THE INVENTION

An object of the present invention is to provide a control device for display state change on a monitor, which can control the movement of a cursor on a stereoscopic picture in the Z-direction and simultaneously handily control the magnification/reduction, the upward/downward scroll, the brightness change or the color change of the picture.

Another object of the present invention is to provide a control device for display state change on a monitor, which can control the movement of a cursor on a stereoscopic picture in the Z-direction and simultaneously handily control the rotation of the entire picture on the X-axis, Y-axis or Z-axis or the rotation of a portion of the picture on an axial line thereof.

In accordance with the first aspect of the present invention, a control device for a display state change on a monitor includes a housing, a first input device mounted in the housing for determining a movement of a cursor on the monitor in an X- and a Y-directions, a second input device for determining two kinds of display state changes which include a movement of the cursor in a Z-direction and a display state change selected from a group consisting of a rotation operation and a picture change on the monitor, and a control circuit mounted in the housing for executing the display state changes.

In accordance with the second aspect of the present invention, the first input device includes a first ball mounted in and partly protruding from the housing, a photo diode in each of the X- and the Y-directions installed in the housing for emitting a light, a grid wheel in each of the X- and the Y-directions installed in the housing and driven by the first ball for intermittently passing therethrough the light, and a photo transistor in each of the X- and the Y-directions installed in the housing for intermittently receiving the light to determine the movement of the cursor on the monitor.

In accordance with the third aspect of the present invention, the second input device includes an actuating element mounted in and partly protruding from the housing, and exerted thereon a force which is resolved into two fractional forces perpendicular to each other when at least one of the two display state changes is to be executed, and an induction element engaging with the actuating element and generating two voltage signals in response to the two fractional forces for respectively determining the two kinds of display state changes.

In accordance with the fourth aspect of the present invention, the actuating element includes a second ball exerted thereon the force to cause a roll state when at least one of the display state changes is to be executed. In this case, the induction element preferably includes two photo encoding assemblies, each of which consists of a photo diode, a grid wheel and a photo transistor and generates one of the voltage signals in response to the roll state for determining one of the display state changes.

In accordance with the fifth aspect of the present invention, the actuating element includes a control stick exerted thereon the force when at least one of the display state changes is to be executed. In this case, the induction element can include a pressure-induction resistor engaging with the control stick, and generating the two voltage signals in response to the two fractional forces for respectively determining the two kinds of display state changes. Also, the induction element can include two potential meters engaging with the control stick and respectively generating the two voltage signals in response to the two fractional forces for determining the two kinds of display state changes, two amplifiers respectively electrically connected to the two potential meters for amplifying the two voltage signals, and two analog/digital converters respectively electrically connected to the two amplifiers for converting the two voltage signals into digital signals.

In accordance with the sixth aspect of the present invention, the actuating element includes an elastic pillar portion exerted thereon the force to generate a deformation state when at least one of the display state changes is to be executed. In this case, the induction element preferably includes two groups of strain gages deformed to generate the two voltage values in response to the deformation state of the elastic pillar portion for respectively determining the two kinds of display state changes. In addition, the second input device preferably further includes a spherical head portion connected to the elastic pillar portion and protruding from the housing for being exerted thereon the force.

In accordance with the seventh aspect of the present invention, the second input device includes two actuating elements mounted to the housing, each of which determines one of the display state changes by being exerted thereon a force, and two induction elements respectively engaging with the two actuating elements, each of which generates an analog voltage signal in response to the force for determining the display state change.

In accordance with the eighth aspect of the present invention, each of the actuating elements includes an analog resistive touch panel mounted on the housing and exerted on a location thereof the force when said display state change is to be executed. In this case, each of the induction elements preferably includes two panel drivers electrically connected to two sides of the analog resistive touch panel for providing a voltage difference between the two sides to allow the generation of the analog voltage signal in response to the location, and an analog/digital converter electrically connected to the two panel drivers for converting the analog voltage signal into a digital signal and transmitting the digital signal to the control circuit.

In accordance with the ninth aspect of the present invention, each of the actuating elements includes a tuning disk mounted in and protruding from the housing and exerted thereon the force to cause a tuning state when said display state change is to be executed. In this case, each of the induction elements preferably includes a variable capacitor engaging with the tuning disk and generating the analog voltage signal in response to the tuning state, a current driver electrically connected to the variable capacitor for providing a current for the variable capacitor, and an analog/digital converter electrically connected to the variable capacitor for converting the analog voltage signal into a digital signal and transmitting the digital signal to the control circuit.

In accordance with the tenth aspect of the present invention, the rotation operation is a rotation of a picture plane on the monitor, the picture plane rotating on an axis selected from a group consisting of the X-axis, Y-axis and Z-axis. Of course, the rotation operation can also be a rotation of a portion of a picture plane on the monitor, the portion of the picture plane rotating on an axial line thereof. Besides, the picture change can also be a magnification/reduction change, an upward/downward scroll, a brightness change or a color change of a picture plane on the monitor.

In accordance with the eleventh aspect of the present invention, the control circuit is electrically connected to a ROM (read only memory) of a computer which designates which kinds of display state changes are to be executed by a firmware therein. The ROM especially indicates an EEPROM (electrically erasable programmable ROM).

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
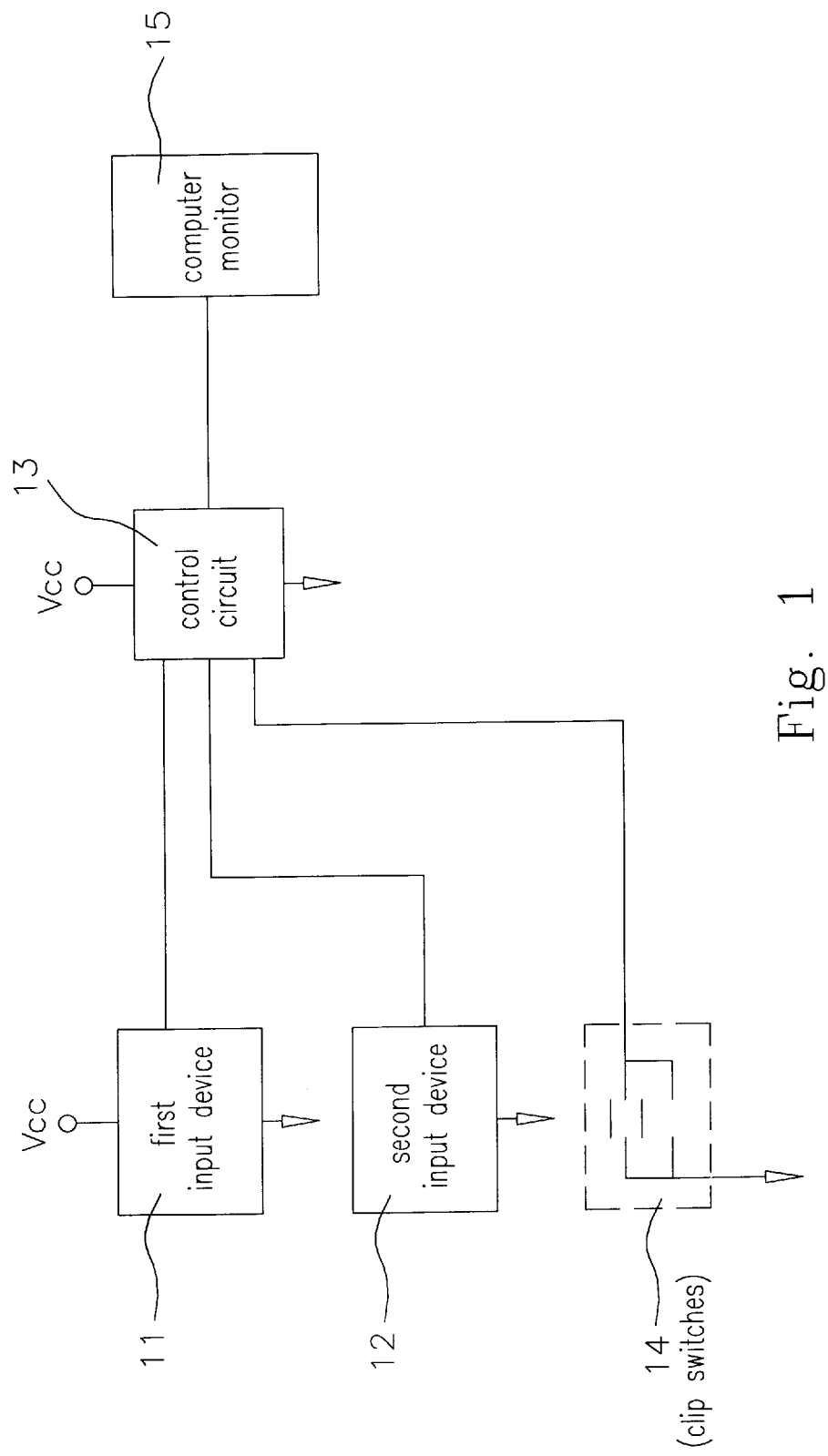
FIG. 1 is a schematic block diagram showing a preferred embodiment of a control device for a display state change on a monitor according to the present invention.

Please refer to FIG. 1 which is a schematic block diagram showing a preferred embodiment of a control device for a display state change on a computer monitor according to the present invention. Two kinds of display state changes can be executed according to the present invention. One of the display state changes is the movement of a cursor in a Z-direction on the computer monitor, and the other one can be a picture change, such as the magnification/reduction operation, the upward/downward scroll, the brightness change or the color change of a picture, or a rotation operation, such as the rotation of the entire picture on the X-axis, Y-axis or Z-axis or a portion of the picture on an axial line thereof The control device shown in FIG. 1 includes a first input device 11 for determining the movement of a cursor on the monitor of the computer 15 in the X- and the Y-directions, a second input device 12 for determining the movement of the cursor on the monitor of the computer 15 in the Z-direction and one of the aforementioned display state changes, a control circuit 13 for executing the movement of the cursor and the picture change or rotation operation, and clip switches 14 the same as those of the conventional mouse.

Figure 2:
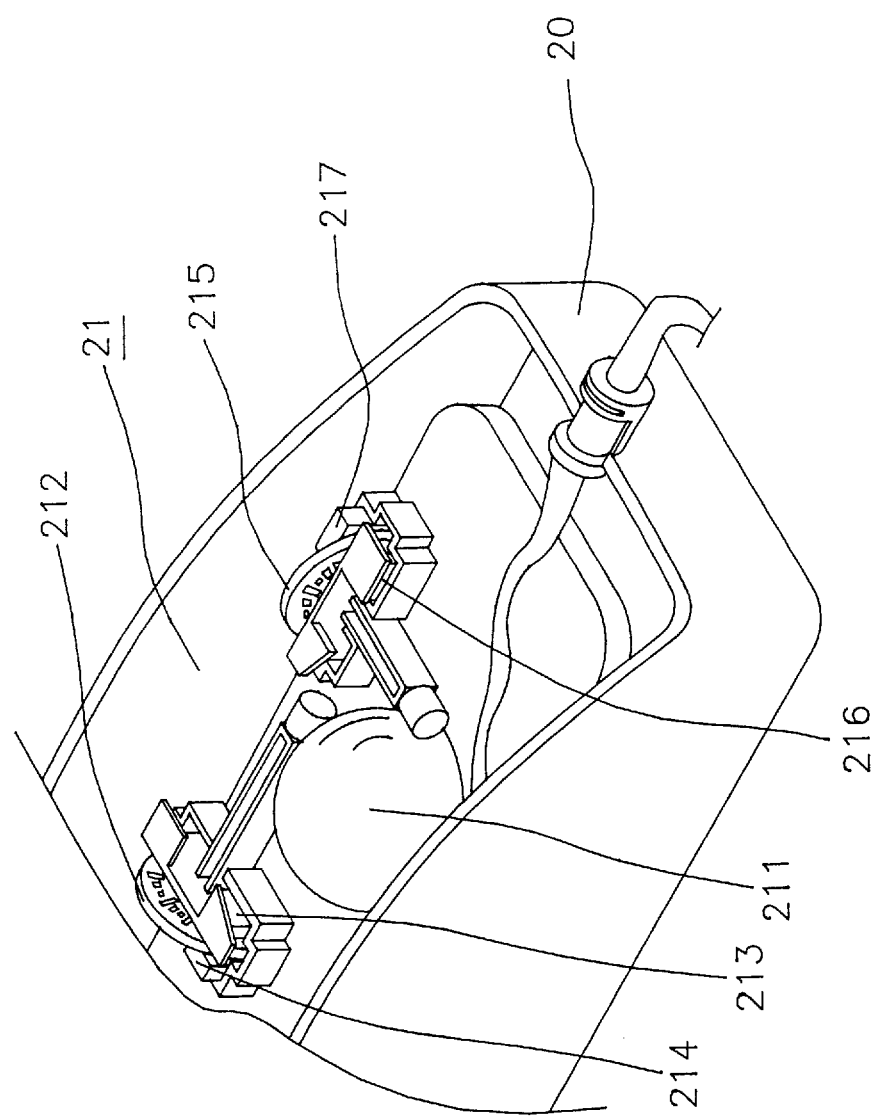
FIG. 2 is a schematic diagram showing a preferred embodiment of the first input device according to the present invention.

A preferred embodiment of the first input device according to the present invention is shown in FIG. 2. The first input device 21 includes a ball 211 mounted in and partly protruding from a housing 20 of the control device, photo diodes 213 and 216 installed in the housing 20 respectively in the X- and the Y-directions for emitting light, grid wheels 212 and 215 installed respectively in the X- and the Y-directions and driven by the ball 211 for intermittently passing therethrough the light, and photo transistors 214 and 217 respectively installed in the X- and the Y-directions for intermittently receiving the light to determine the movement of the cursor on the computer monitor. The working principle of the above input device is well known to those skilled in the art, so it is not to be redundantly described here.

The display state change determined by the second input device includes the movement of the cursor on the computer monitor in the Z-direction and a special function which can be the magnification/reduction operation, the upward/downward scroll, the brightness change or the color change of a picture, the rotation of the entire picture on the X-axis, Y-axis or Z-axis, or the rotation of a portion of the picture on an axial line thereof As known to those skilled in the art, the designation of the display state change can be executed by the computer software, for example, a firmware in EEPROM. The second input device has various embodiments, and four preferred embodiments will be described hereinafter.

Figure 3:
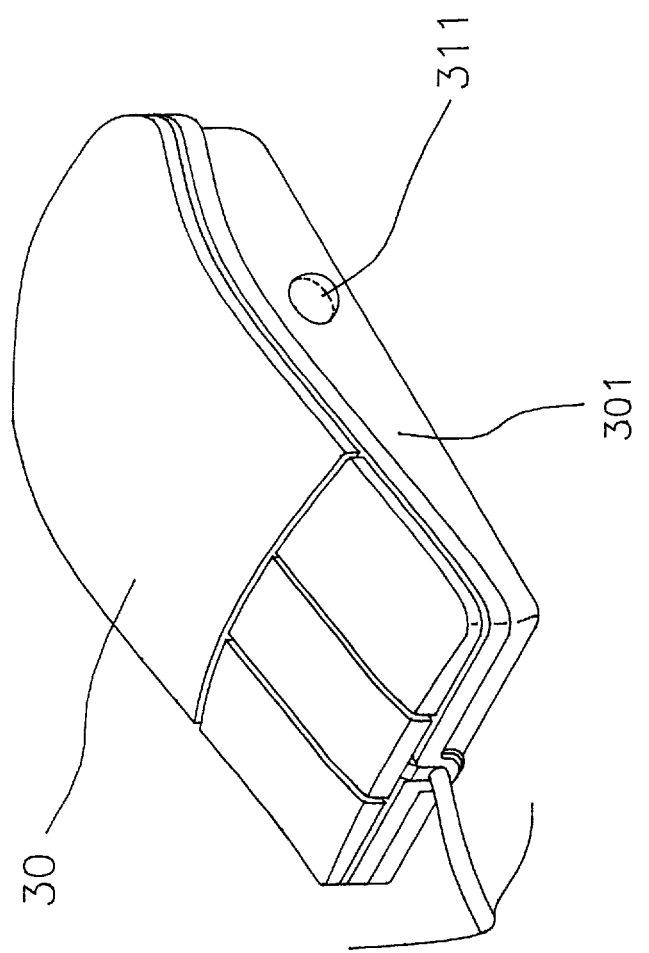
FIG. 3 schematically shows the installation of a first preferred embodiment of the second input device in the housing according to the present invention.
Figure 4:
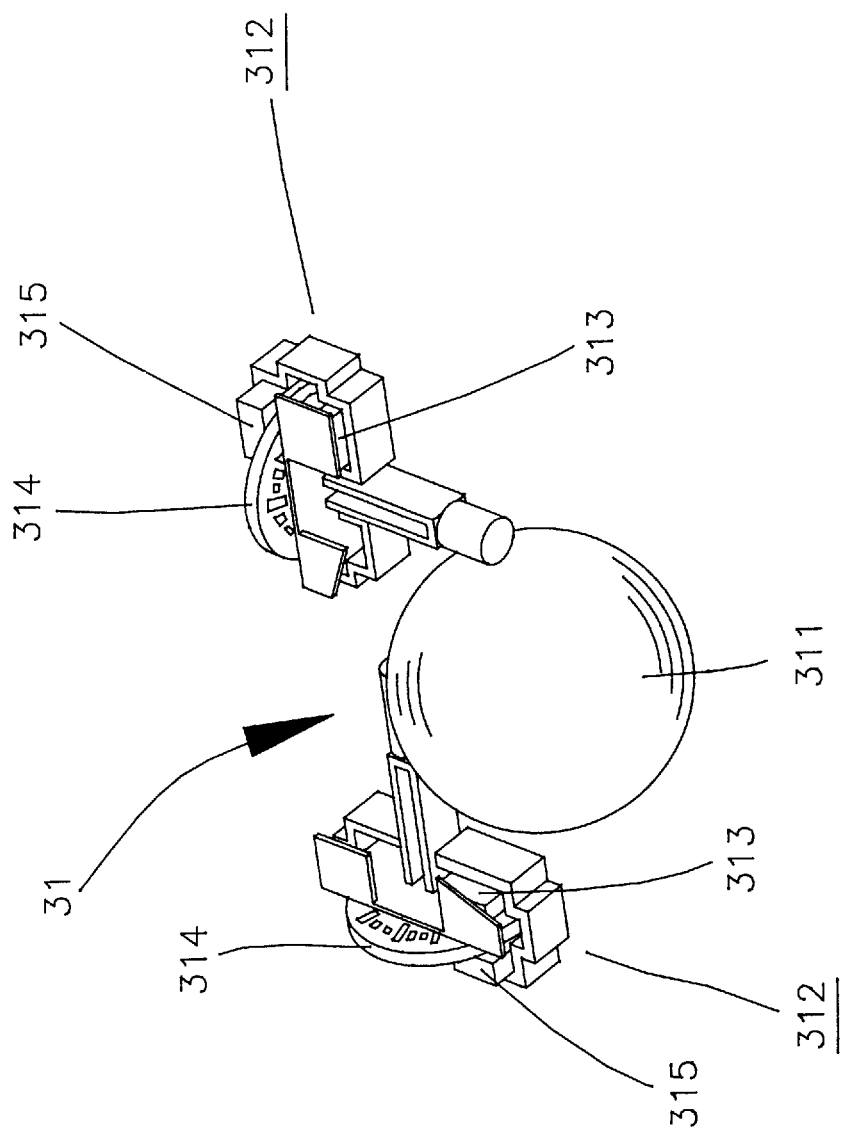
FIG. 4 is a schematic diagram showing the first preferred embodiment of the second input device.

Please refer to FIGS. 3 and 4 in which a first preferred embodiment of the second input device according to the present invention is schematically shown. The second input device 31 includes a ball 311 mounted in and partly protruding from a side surface 301 of a housing 30, and exerted thereon a force to make the ball 311 rotate to cause a roll state when at least one display state change is to be executed, and two photo encoding assemblies 312, each of which consists of a photo diode 313, a grid wheel 314 and a photo transistor 315. When the force is not a exactly forward, backward, upward or downward force, the force can be resolved into two fractional forces perpendicular to each other for respectively enabling the two photo encoding assemblies 312 to generate two signals at the same time. Of course, one of the fractional forces can be controlled to be zero, i.e. the force is controlled to be substantially exactly forward, backward, upward or downward, and only one signal is generated to control one kind of display state change. The one or two signals are then transmitted to the control circuit (the numeral reference 13 in FIG. 1) for further processing. When in use, the user can exert the force on the ball 311 with his thumb. The rotation of the ball 311 will drive the rotation of the grid wheels 312 and further actuate the photo encoding operation of the photo diodes 313 and the photo transistors 314. By this way, the movement of the cursor on the monitor in the Z-direction and the picture change or rotation operation can be determined and controlled.

Figure 5:
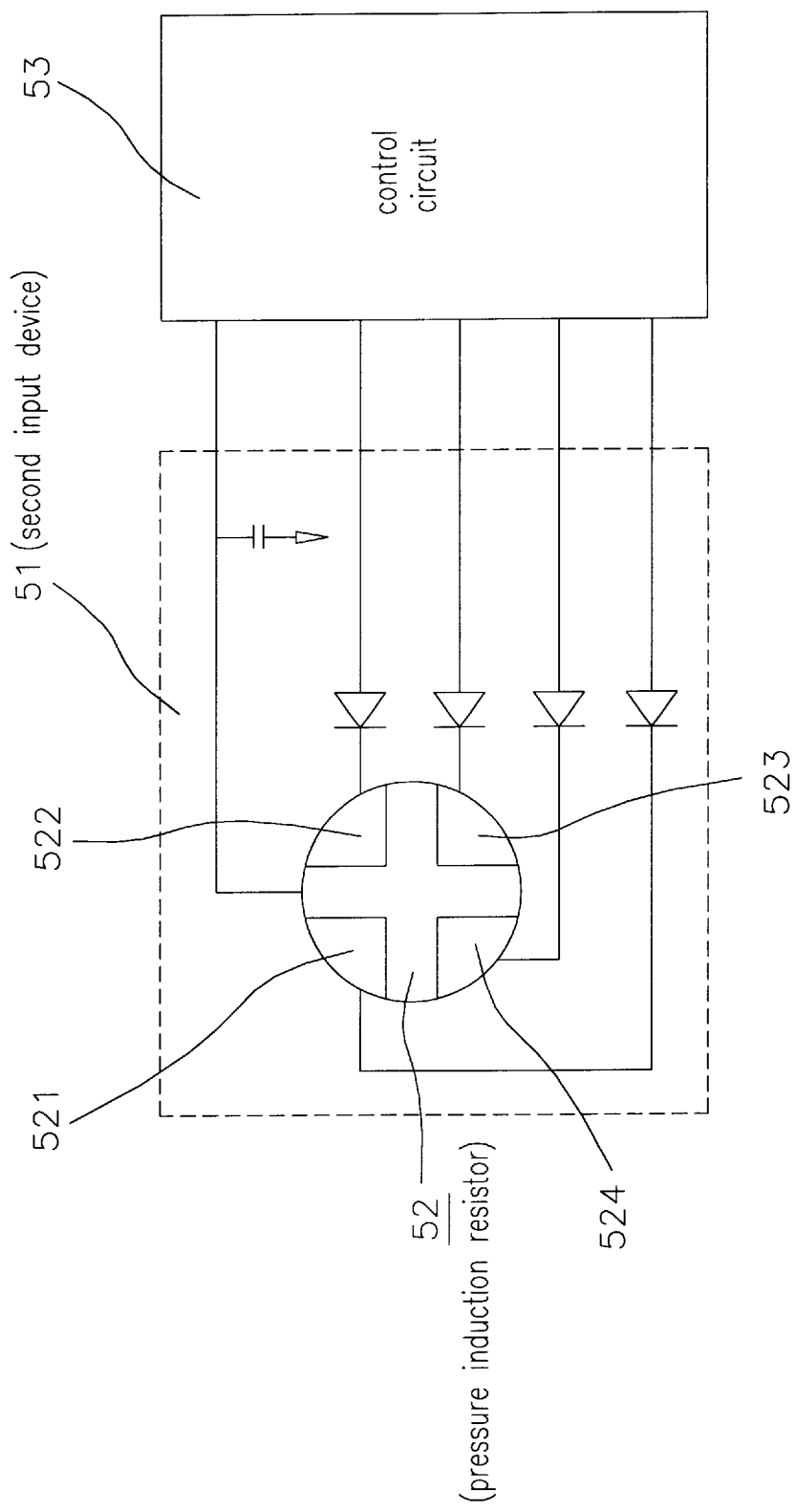
FIG. 5 is a circuit block diagram schematically showing a second preferred embodiment of the second input device according to the present invention.
Figure 6:
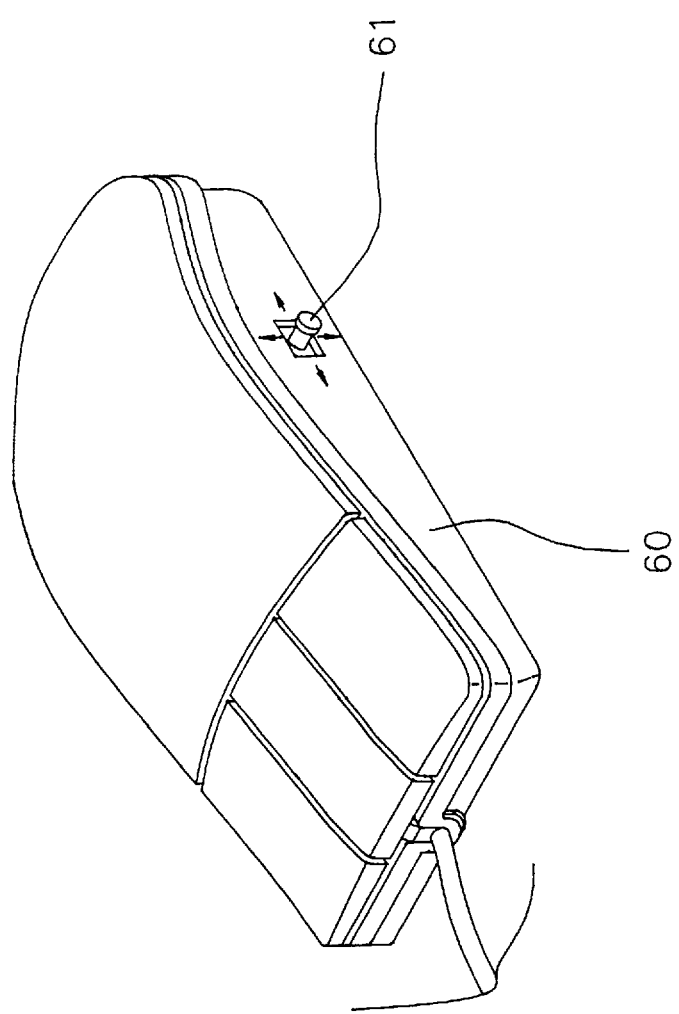
FIG. 6 schematically shows the installation of the second preferred embodiment of the second input device in the housing.
Figure 7:
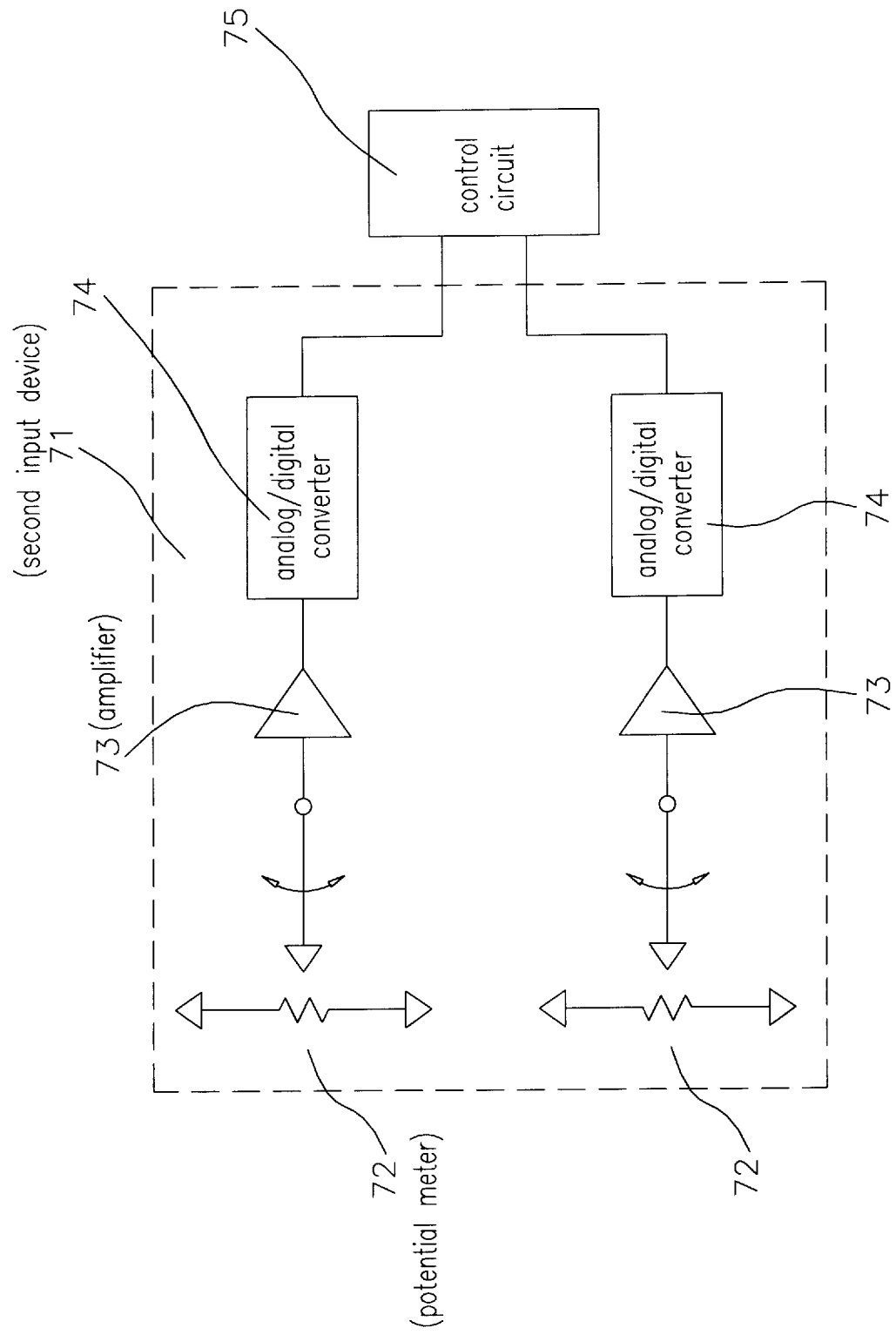
FIG. 7 is a circuit block diagram schematically showing a third preferred embodiment of the second input device according to the present invention.

Please refer to FIGS. 5 and 6 concerning a second preferred embodiment of the second input device according to the present invention. The second input device 51 includes a pressure-induction resistor 52 which generates various resistance values in response to different pressure values exerted thereon to determine the display state changes. The pressure-induction resistor 52 is divided into four regions 521, 522, 523 and 524, each of which represents one kind of display state change. For example, the regions 521 and 523 respectively represent the movement in a +Z-direction and a −Z-direction, and the regions 522 and 524 respectively represent the clockwise and counter-clockwise rotation of a selected portion on a Z-axial line thereof. The control circuit 53 then executes each of the display state changes according to the pressed regions and voltage signals derived from the resistance values. As shown in FIGS. 6 and 7, a force can be exerted on the pressure-induction resistor 52 through a control stick 61 which is included in the second input device and mounted in and partly protruding from the housing 60. The force can be resolved into two fractional forces for respectively pressing two adjacent regions of the pressure-induction resistor 52 to control two kinds of display state changes. Of course, one of the two fractional forces may be zero and only one kind of display state change is determined. An example of operation is given only for purpose of illustration rather than exactly describing the function of the present invention. When the user pushes the control stick 51 forwards, the quarter portion 521 of the resistor 52 is pressed to generate a resistance value to determine the distance that the cursor should move on the monitor so that the cursor is moved by such a distance, for example, along the +Z-direction. On the contrary, the cursor can be moved by a distance, for example, along the −Z-direction when the control stick 51 is pushed backwards to press the quarter portion 523 of the resistor 52. Moreover, the selected portion rotates clockwise when the control stick 51 is pushed upwards to press the quarter portion 522 and the selected portion rotates counter-clockwise when the control stick 51 is pushed downwards to press the quarter portion 524.

Figure 8:
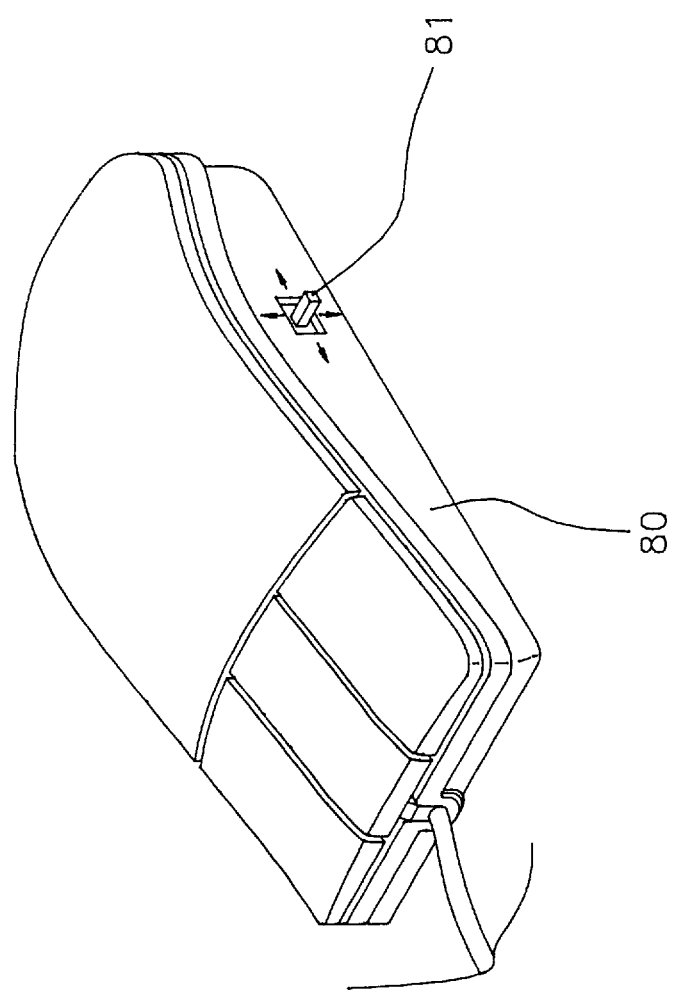
FIG. 8 schematically shows the installation of the third preferred embodiment of the second input device in the housing.

Please refer to FIGS. 7 and 8 concerning a third preferred embodiment of the second input device according to the present invention. The second input device 71 includes a control stick 81 mounted in and partly protruding from a housing 80, two potential meters 72 engaging with the control stick 81, two amplifiers 73 respectively electrically connected to the two potential meters 72, and two analog/digital converters 74 respectively electrically connected to the two amplifiers 73. When a force is exerted on the control stick 81, the force is resolved into two fractional forces which make the two potential meters 72 generate two voltage signals, respectively, for determining two kinds of display state changes. Of course, one of the two fractional forces may be zero and only one kind of display state change is determined. The voltage signal(s) is then transmitted to the amplifier(s) 73 to be amplified, and further transmitted to the analog/digital converter(s) to be converted into digital signal(s). The control circuit 75 receives the digital signal and executes the display state change(s) according to the digital signal(s). An example of operation is given only for purpose of illustration rather than exactly describing the function of the present invention. For example, when the user pushes the control stick 81 forwards, one of the potential meters 72 is enabled to generate a positive voltage value to determine the distance that the cursor should move on the monitor so that the cursor is moved by such a distance along the +Z-direction. On the contrary, the cursor can be moved by a distance along the −Z-direction when the control stick 81 is pushed backwards. Moreover, the color of the picture is turned from a high frequency color into a low frequency color when the control stick 81 is pushed upwards, and the color of the picture is turned from a low frequency color into a high frequency color when the control stick 81 is pushed downwards.

Figure 9:
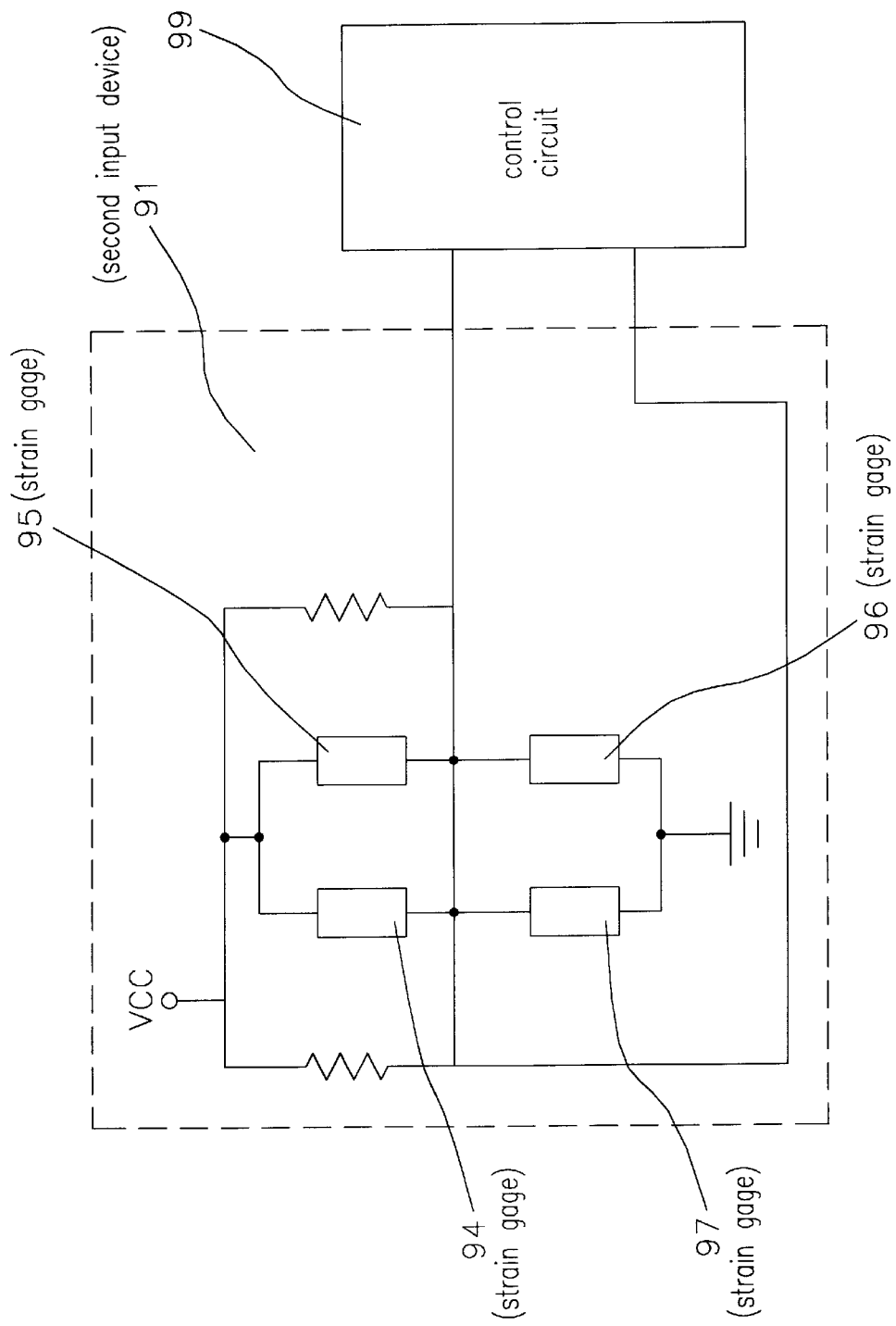
FIG. 9 is a circuit block diagram schematically showing a fourth preferred embodiment of the second input device according to the present invention.
Figure 10:
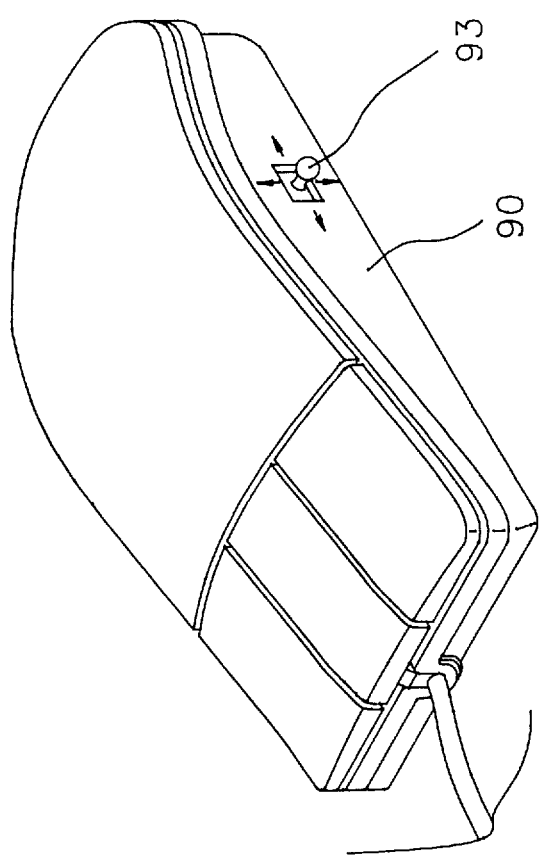
FIG. 10 schematically shows the installation of the fourth preferred embodiment of the second input device in the housing.
Figure 11:
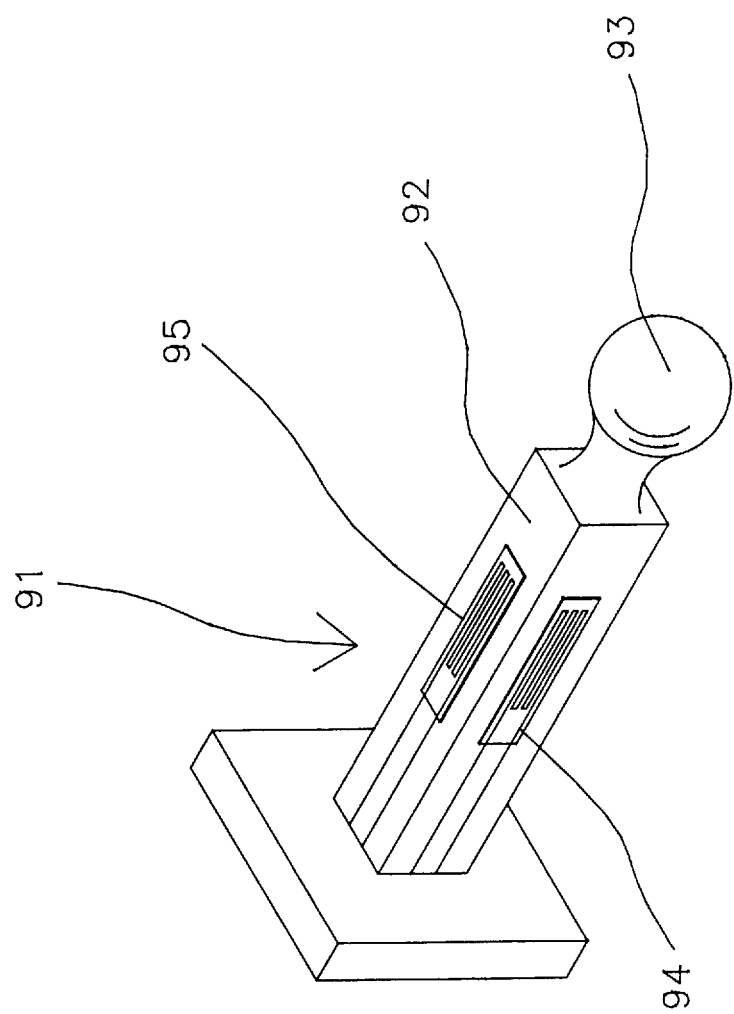
FIG. 11 is a schematic diagram showing the fourth preferred embodiment of the second input device.

Please refer to FIGS. 9, 10 and 11 concerning a fourth preferred embodiment of the second input device according to the present invention. The second input device 91 includes an elastic pillar portion 92 mounted in a housing 90, a head portion 93 connected to the pillar portion 92 and protruding from the housing 90, and four strain gages 94, 95, 96 and 97 mounted on the pillar portion 92 (in FIG. 11, the strain gages 96 and 97 respectively opposed to the gages 94 and 95 are not shown). When in use, the head portion 93 is exerted thereon a force to make the elastic pillar portion 92 deform, and the strain gages 94, 95, 96 and/or 97 deform with the deformation of the elastic pillar portion 92. Because the force can be resolved into two fractional forces, two adjacent strain gages can be deformed for determining two kinds of display state change simultaneously. Of course, one of the two forces may be zero and only one kind of display state change is executed. As known to those skilled in the art, with the variations of the deformation degree, the strain gages will perform various resistance values. When the resistance value is changed, the output voltage will also be changed. An example of operation is given only for purpose of illustration rather than exactly describing the function of the present invention. For example, each of the strain gages 94, 96, 95 and 97 determines a respective one of the cursor movement in the +Z-direction, the cursor movement on the −Z-direction, the magnification of the picture plane, and the reduction of the picture plane. In other words, when the head portion 93 is pushed forwards, backwards, upwards or downwards, one of the strain gages 94, 96, 95 and 97 on the pillar portion 92 will be deformed to generate a voltage value. The control circuit 99 receives and processes the voltage value to achieve the purpose of controlling one of the above-mentioned display state changes.

Figure 12:
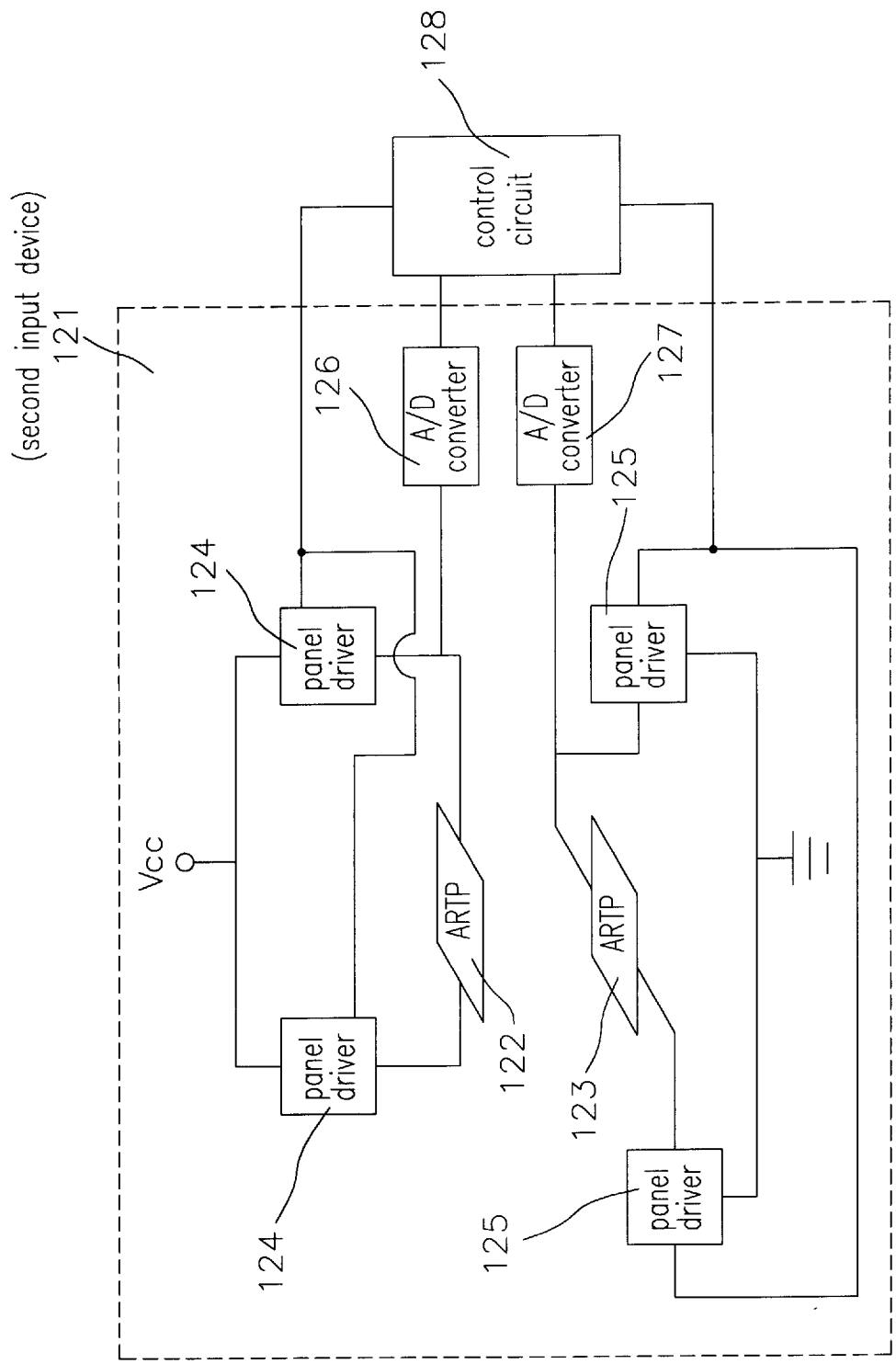
FIG. 12 is a circuit block diagram schematically showing a fifth preferred embodiment of the second input device according to the present invention.
Figure 13:
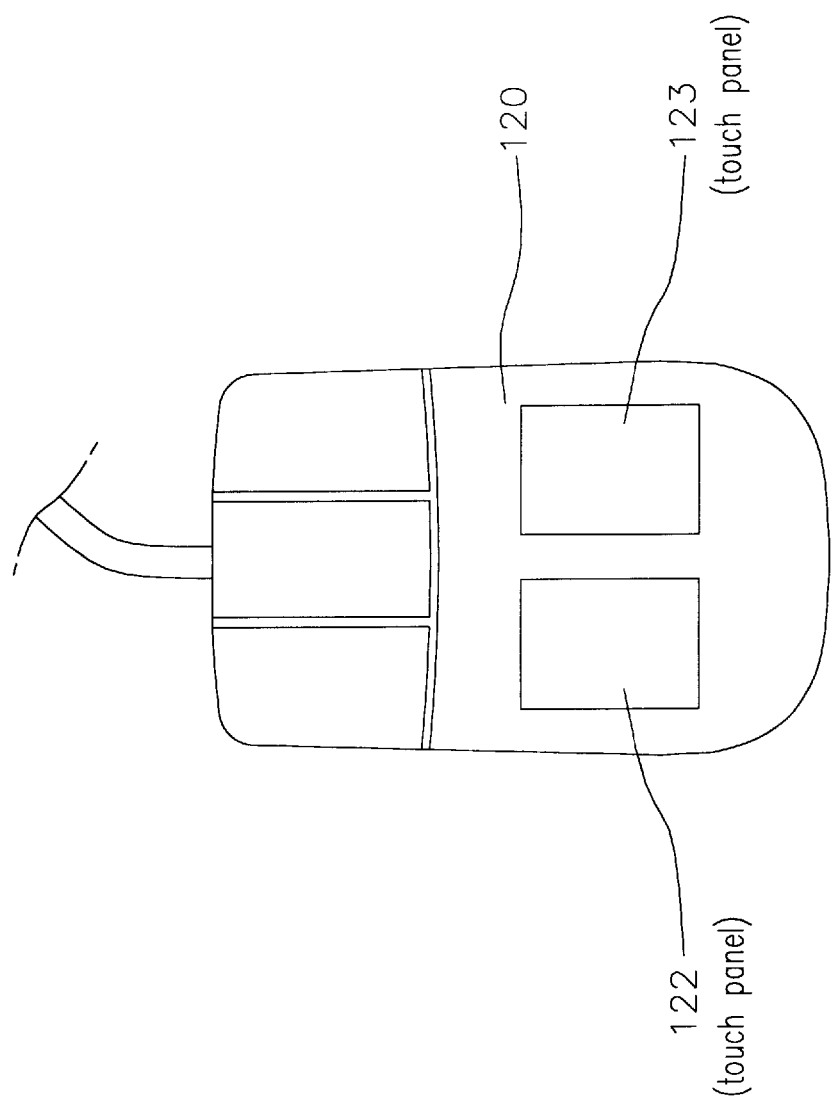
FIG. 13 schematically shows the installation of the fifth preferred embodiment of the second input device in the housing.

Please refer to FIGS. 12 and 13 concerning a fifth preferred embodiment of the second input device according to the present invention. The second input device 121 includes two analog resistive touch panels (ARTP) 122 and 123 which are mounted on the surface of the housing 120 and usually made of indium tin oxide, two groups of panel drivers 124 and 125 respectively electrically connected to the two touch panels 122 and 123 at their respective two ends. Each of the two groups of panel drivers 124 and 125 provides a voltage difference between the two sides of one of the touch panels 122 and 123, and thus makes different resistance values generated at different locations between the two sides. The second input device 121 further includes two analog/digital converters 126 and 127 electrically connected to the two panel drivers 124 and 125, respectively, for converting the analog voltage signals generated in response to the resistance values into digital signals. Then the digital signals are transmitted to the control circuit for further processing. In this case, the touch panel 122, panel drivers 124 and analog/digital converter 126 are grouped to determine one kind of display state change, for example, the movement of the cursor in the Z-direction on the monitor. On the other hand, the touch panel 123, panel drivers 125 and analog/digital converter 127 are grouped to determine another kind of display state change, for example, the brightness change of the picture. When in use, the user touches a specific location of the touch panel 122 or 123, a specific resistance value is caused to generate a specific analog voltage signal due to the function of the panel drivers 124 or 125. The analog voltage signal is then outputted to the analog/digital converter 126 or 127 to be converted into a digital signal and further transmitted to a control circuit 128. The control circuit 128 receives and processes the signal to execute the display state change.

Figure 14:
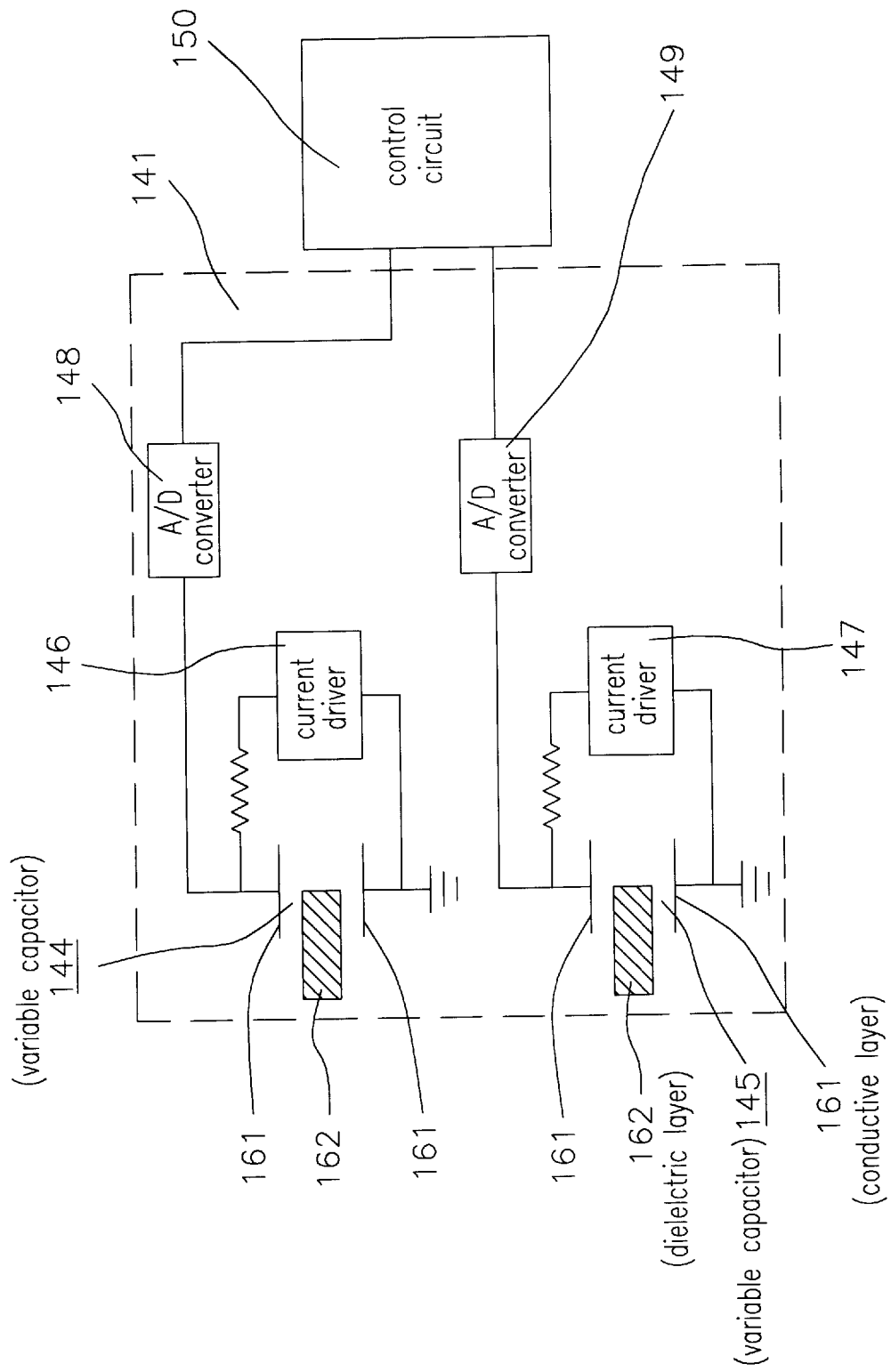
FIG. 14 is a schematic diagram showing the fifth preferred embodiment of the second input device.
Figure 15:
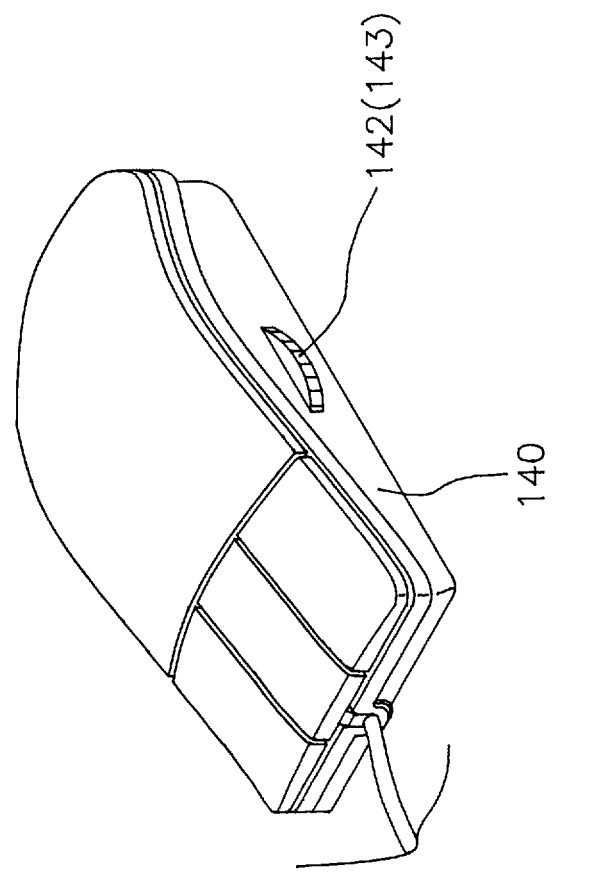
FIG. 15 is a circuit block diagram schematically showing a sixth preferred embodiment of the second input device according to the present invention.
Figure 16:
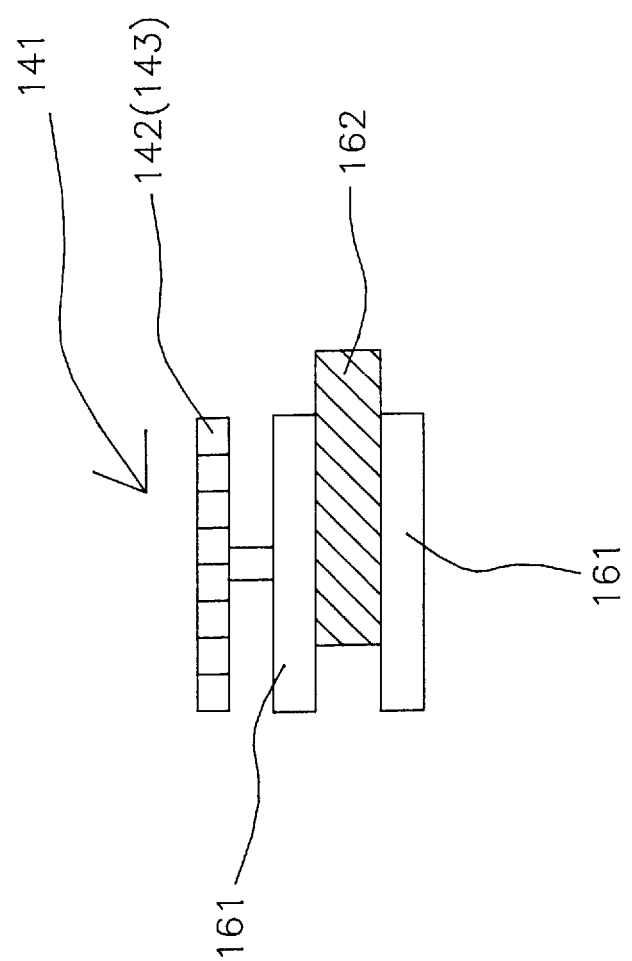
FIG. 16 schematically shows the installation of the sixth preferred embodiment of the second input device in the housing.

Please refer to FIGS. 14, 15 and 16 concerning a sixth preferred embodiment of the second input device according to the present invention. The second input device 141 includes two tuning disks 142 and 143 mounted in a housing 140 and respectively partly protruding from two opposite side surfaces of the housing 140, two variable capacitors 144 and 145 respectively engaging with the two tuning disks 142 and 143 and each of which includes two conductive layers 161 and a dielectric layer 162, two current driver 146 and 147 respectively electrically connected to the two variable capacitors 144 and 145, two analog/digital converters 148 and 149 respectively electrically connected to the two variable capacitors 144 and 145. Each of the current drivers 146 and 147 provides a current for one of the variable capacitors 144 and 145. When the user turning one of the tuning disks 142 and 143, the corresponding one of the two variable capacitors 144 and 145 generates an analog voltage signal in response to the turning degree of the tuning disk 142 or 143. The turning degree of the tuning disk 142 or 143 will determine the occupied space between the two conductive layers 161 of the variable capacitor 144 or 145 by the dielectric layer 162 so that the capacitance value of the variable capacitor 144 or 145 is determined. The analog voltage signal is then transmitted to the corresponding one of the two analog/digital converters 148 and 149 for being converted into a digital signal. In this case, the tuning disk 142, variable capacitor 144, current driver 146 and analog/digital converter 148 are grouped to determine one kind of display state change, for example, the movement of the cursor in the Z-direction on the monitor. On the other hand, the tuning disk 143, variable capacitor 145, current driver 147 and analog/digital converter 149 are grouped to determine another kind of display state change, for example, the upward/downward scroll of the picture. When in use, the user turning the tuning disk 142 or 143 to a certain degree, a specific capacitance value is caused to generate a specific analog voltage signal. The analog voltage signal is then outputted to the analog/digital converter 148 or 149 to be converted into a digital signal and further transmitted to a control circuit 150. The control circuit 150 receives and processes the signal to execute the display state change.

Of course, the installation modes and the structures of the preferred embodiments of the second input device shown in FIGS. 3, 4, 6, 8, 10, 11, 13, 14 and 16 are not limited to the types as illustrated. In stead, they can be modified according to practical requirements. For example, the first to the fourth preferred embodiments of the second input device can be mounted on the left side for right hand use, or the right side for the left hand use. In the sixth preferred embodiment of the second device, the two tuning disks can protrude from the same surface of the housing.

To sum up, the present invention provides a control device which can control the movement of a cursor on a monitor in the Z-direction and simultaneously for other special functions, such as the magnification/reduction operation, the upward/downward scroll, the brightness change or the color change of a picture, or the rotation of the entire picture on the X-axis, Y-axis or Z-axis or a portion of the picture on an axial line thereof, designated by the computer software, for example, the firmware in EEPROM. From the preferred embodiments illustrated above, it can be found that the control device for a display state change on a monitor according to the present invention has an advantage of easy manipulation.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control device for making a display state change on a monitor, said device comprising:
   a housing;
   a first input device mounted in said housing for determining a movement of a cursor on said monitor in an X- and a Y-directions;
   a second input device for giving two-dimensional control, said second input device being mounted in said housing and having a stick element partly protruding from a side surface of said housing for enabling said stick element to be manipulated by a thumb of a user wherein the two dimensions of said second two-dimensional input device respectively control two kinds of display state changes which include a movement of said cursor in a Z-direction, a rotation operation and a picture change on said monitor; and a control circuit mounted in said housing for executing said display state change responsive to control by said stick element.

2. A control device according to claim 1 wherein said first input device includes:

a first ball mounted in and partly protruding from said housing;

a photo diode in each of said X- and said Y-directions installed in said housing for emitting a light;

a grid wheel in each of said X- and said Y-directions installed in said housing and driven by said first ball for intermittently passing therethrough said light; and a photo transistor in each of said X- and said Y-directions installed in said housing for intermittently receiving said light to determine said movement of said cursor on said monitor.

3. A control device according to claim 1 wherein said second input device includes:

said stick element mounted so that a force exerted thereon is resolved into two fractional forces perpendicular to each other when at least one of said two kinds of display state changes is to be executed; and an induction element engaging with said stick element and generating two voltage signals in response to said two fractional forces for respectively determining said two kinds of display state changes.

4. A control device according to claim 3 wherein said stick element includes a control stick wherein said force is exerted thereon when at least one of said two kinds of display state changes is to be executed.

5. A control device according to claim 4 wherein said induction element includes a pressure-induction resistor engaging with said control stick, and generating said two voltage signals in response to said two fractional forces for respectively determining said two kinds of display state changes.

6. A control device according to claim 4 wherein said induction element includes:

two potential meters engaging with said control stick and respectively generating said two voltage signals in response to said two fractional forces for determining said two kinds of display state changes;

two amplifiers respectively electrically connected to said two potential meters for amplifying said two voltage signals; and two analog/digital converters respectively electrically connected to said two amplifiers for converting said two voltage signals into digital signals.

7. A control device according to claim 3 wherein said stick element includes an elastic pillar portion, said force being exerted on said pillar portion to generate a deformation state when at least one of said two kinds of display state changes is to be executed.

8. A control device according to claim 7 wherein said induction element includes two groups of strain gages deformed to generate said two voltage values in response to said deformation state of said elastic pillar portion for respectively determining said two kinds of display state changes.

9. A control device according to claim 8 wherein said second input device further includes a spherical head portion connected to said elastic pillar portion and protruding from said housing for being exerted thereon said force.

10. A control device according to claim 1 wherein said rotation operation is a rotation of a picture plane on said monitor, said picture plane rotating on an axis selected from a group consisting of the X-axis, Y-axis and Z-axis.

11. A control device according to claim 1 wherein said rotation operation is a rotation of a portion of a picture plane on said monitor, said portion of said picture plane rotating on an axial line thereof.

12. A control device according to claim 1 wherein said picture change is a magnification/reduction change of a picture plane on said monitor.

13. A control device according to claim 1 wherein said picture change is an upward/downward scroll of a picture plane on said monitor.

14. A control device according to claim 1 wherein said picture change is a brightness change of a picture plane on said monitor.

15. A control device according to claim 1 wherein said picture change is a color change of a picture plane on said monitor.

16. A control device according to claim 1 wherein said control circuit is electrically connected to a ROM (read only memory) of a computer which designates which kinds of display state changes are to be executed by a firmware therein.

17. A control device according to claim 1 wherein said control circuit is electrically connected to an EEPROM (electrically erasable programmable ROM) of a computer which designates which kinds of display state changes are to be executed by a firmware therein.

* * * * *